(12) United States Patent
Flynn et al.

(10) Patent No.: US 10,919,455 B2
(45) Date of Patent: Feb. 16, 2021

(54) VEHICLE STORAGE COMPARTMENT

(71) Applicant: KARMA AUTOMOTIVE LLC, Irvine, CA (US)

(72) Inventors: Jacques Flynn, Irvine, CA (US); Andre Franco Luis, Irvine, CA (US); Andreas Thurner, Irvine, CA (US)

(73) Assignee: Karma Automotive LLC, Irvine, CA (US)

( * ) Notice: Subject to any disclaimer, the term of this patent is extended or adjusted under 35 U.S.C. 154(b) by 128 days.

(21) Appl. No.: 16/378,172

(22) Filed: Apr. 8, 2019

(65) Prior Publication Data

US 2020/0317134 A1 Oct. 8, 2020

(51) Int. Cl.
| | |
|---|---|
| *B60R 11/06* | (2006.01) |
| *B60R 5/00* | (2006.01) |
| *B60R 7/04* | (2006.01) |
| *E05F 15/40* | (2015.01) |
| *B60J 5/04* | (2006.01) |
| *B60R 11/00* | (2006.01) |

(52) U.S. Cl.
CPC ............ *B60R 5/006* (2013.01); *B60J 5/0472* (2013.01); *B60R 7/04* (2013.01); *E05F 15/40* (2015.01); *B60R 2011/0019* (2013.01); *B60R 2011/0029* (2013.01); *B60R 2011/0036* (2013.01); *B60R 2011/0084* (2013.01)

(58) Field of Classification Search
CPC .. B60R 7/04; B60J 7/145; B60J 1/1823; B60J 7/223; B60H 1/005; B60H 1/00492; B60K 1/04; Y10S 224/926; B60N 2/793; B60N 2/3011
See application file for complete search history.

(56) References Cited

U.S. PATENT DOCUMENTS

| | | | | |
|---|---|---|---|---|
| 5,050,922 | A * | 9/1991 | Falcoff | B60R 7/04 |
| | | | | 224/311 |
| 6,158,795 | A * | 12/2000 | Gray | B60K 37/00 |
| | | | | 296/37.8 |
| 6,439,525 | B1 * | 8/2002 | Gehring | B60N 3/102 |
| | | | | 248/311.2 |
| 6,499,785 | B2 * | 12/2002 | Eguchi | B60R 7/04 |
| | | | | 160/201 |
| 6,709,041 | B1 * | 3/2004 | Hotary | B60K 37/00 |
| | | | | 296/70 |
| 6,921,118 | B2 * | 7/2005 | Clark | B60N 3/102 |
| | | | | 296/24.34 |
| 7,347,471 | B2 * | 3/2008 | Whitens | B60N 2/793 |
| | | | | 296/24.34 |
| 7,862,096 | B2 * | 1/2011 | Kim | B60R 7/06 |
| | | | | 296/37.12 |
| 7,980,409 | B2 * | 7/2011 | Vasko | B60R 7/04 |
| | | | | 220/326 |

(Continued)

*Primary Examiner* — Kiran B Patel
(74) *Attorney, Agent, or Firm* — Gordon Rees Scully Mansukhani, LLP

(57) ABSTRACT

A storage compartment of a vehicle including a passenger compartment and a passenger compartment door controlling access to the passenger compartment. The storage compartment includes a base and a side wall surrounding a storage volume. The storage compartment is located forward of a footwell of the passenger compartment, the storage compartment is further positioned so that an opening to the storage volume is accessible from a lateral side of the vehicle.

14 Claims, 5 Drawing Sheets

(56) References Cited

U.S. PATENT DOCUMENTS

| | | | |
|---|---|---|---|
| 8,511,733 B2 | 8/2013 | Blackmore et al. | |
| 8,740,278 B1* | 6/2014 | Mally | B60R 7/06 |
| | | | 296/37.12 |
| 8,919,847 B2* | 12/2014 | Mather | B60R 7/04 |
| | | | 296/24.34 |
| 9,156,407 B1* | 10/2015 | Kramer | B60R 7/04 |
| 9,199,581 B2* | 12/2015 | Ishibashi | B60R 7/06 |
| 9,725,019 B2* | 8/2017 | Mather | B60N 2/3075 |
| 10,106,092 B2* | 10/2018 | Huebner | B60N 3/101 |
| 10,343,574 B2* | 7/2019 | Faruque | F16C 35/02 |
| 10,457,171 B2* | 10/2019 | Line | B60N 2/206 |
| 2003/0234550 A1* | 12/2003 | Brooks | B60R 11/0211 |
| | | | 296/24.46 |
| 2006/0181103 A1* | 8/2006 | Khan | B60R 7/043 |
| | | | 296/37.14 |
| 2007/0152461 A1* | 7/2007 | Joler | B60R 7/04 |
| | | | 296/24.34 |
| 2008/0079278 A1* | 4/2008 | Rajappa | B60R 7/04 |
| | | | 296/24.34 |
| 2009/0174208 A1* | 7/2009 | Lota | B60R 7/04 |
| | | | 296/24.34 |

* cited by examiner

VEHICLE STORAGE COMPARTMENT

BACKGROUND

The present disclosure relates to storage compartment of a vehicle, and in particular a storage compartment located on the lateral side of the vehicle.

In today's vehicles, cargo and storage space is necessary, however, available space on a vehicle is scarce, and it is difficult to add additional storage space to a vehicle due to physical constraints or without compromising space for the occupants of the vehicle. It is desirable to find new solutions to add storage space without these disadvantages.

SUMMARY

An embodiment of a vehicle storage compartment is disclosed herein. The storage compartment is located in a vehicle comprising a passenger compartment and a passenger compartment door. The passenger compartment includes a footwell where the storage compartment is located forward of the footwell. The passenger compartment door controls access to the storage compartment and the passenger compartment. The storage compartment is positioned so that an opening to the storage volume is accessible from a lateral side of the vehicle.

In another embodiment of a vehicle storage compartment, the storage compartment is located on a door sill of a passenger compartment door. The passenger compartment door may include multiple partitions.

DETAILED DESCRIPTION

Figure 1:
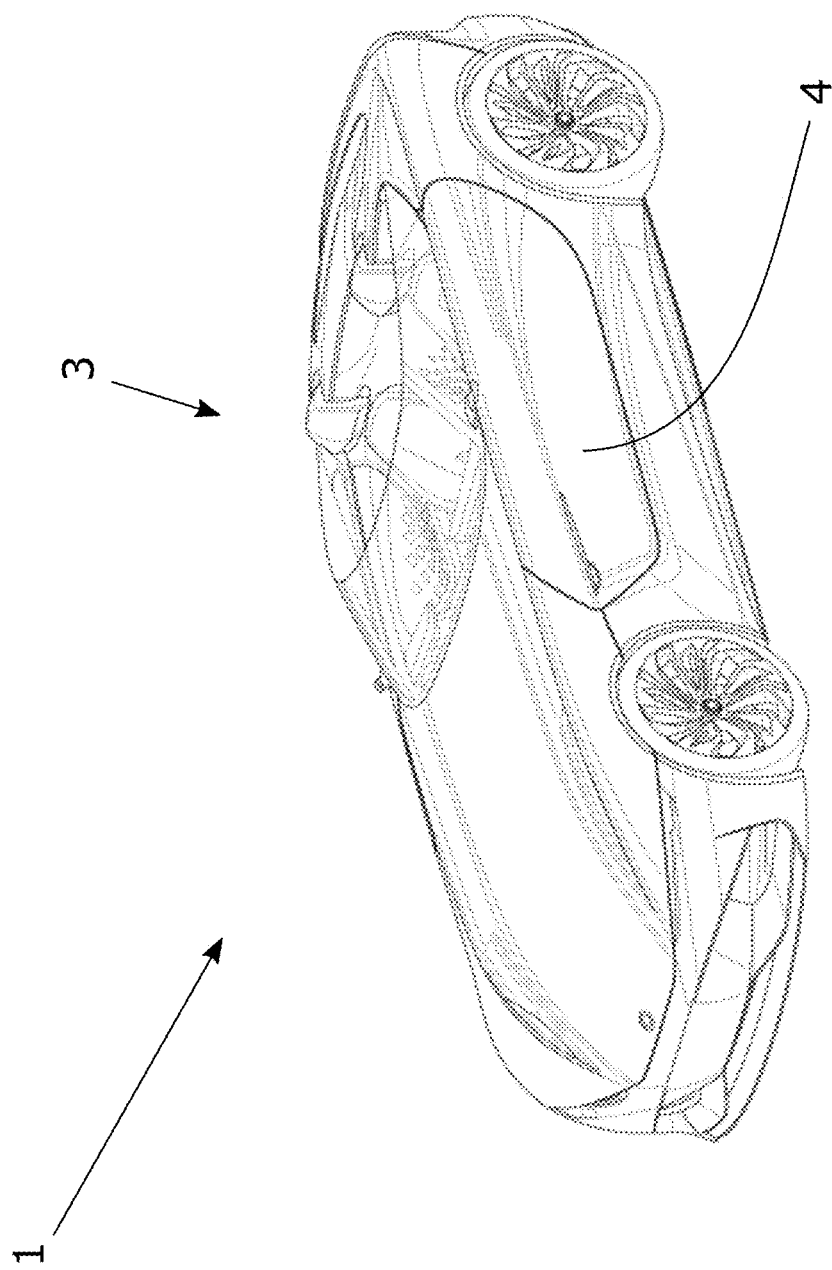
FIG. 1 is a vehicle equipped with a vehicle storage compartment.

One embodiment of the disclosure is directed to a storage compartment of a vehicle located on the lateral side of the vehicle. In an exemplary embodiment the storage compartment may be located forward of the footwell, however the described storage compartment may be placed at other locations in the vehicle where access from the lateral side of vehicle is possible and sufficient space is available. This location of the storage compartment allows more storage space to be created without compromising space for the occupants of the vehicle. The exemplary storage compartment may be located at either or both the driver and passenger sides of the vehicle.

One embodiment of the storage compartment may include closures such as a sliding compartment configured to be pulled out of the vehicle from the lateral side or a selectively covering storage compartment door placed at the opening of the storage compartment. The mechanism of the sliding compartment may include track and roller mechanism, rolling bearings, or any similar mechanism to allow the sliding compartment to be pulled out of vehicle. Another embodiment of the storage compartment may also include an exposed storage volume such that the passenger compartment door controls the access to the storage compartment such that the passenger compartment door of the vehicle encloses the storage volume. This embodiment allows a much simpler design and cost effective design.

The cross sections of the storage compartment maybe vary depending on the requirements of the car. For example, the cross sectional shape of the storage compartment may be a square, circle, semicircle, triangle, oval. The dimensions of the storage compartment may also not be uniform along a longitudinal axis of the storage compartment. For example, the storage compartment may taper or widen across it's longitudinal axis.

The storage compartment may also include a divider(s) which partitions the storage compartment so that multiple storage spaces or volumes are created within the storage compartment. Other accessories such as cargo nets, shelves, etc. may be placed in the storage compartment. Sensors may also be placed proximate to the storage compartment, and the sensors may be configured to provide a signal and/or indication whether or not the storage compartment is open or closed. The sensor signal may be communicated to a locking mechanism of the passenger compartment door to prevent the closure of the passenger compartment door to avoid damage to the storage compartment in the case where the storage compartment is open. The use of a sensor may be important for an embodiment which includes a movable storage compartment that may slide in and out of the vehicle. Exemplary sensors such as proximity sensors, position sensors, electromagnetic sensors, or any other similar sensors configured to detect the closure of the storage compartment may be used. The locking mechanism may be electronic or analog and may comprise a manual override so that a user may control the passenger compartment door regardless of the sensor reading in the event of a malfunctioning sensor or in an emergency.

The storage compartment may include a cover or door to close off access to the storage space or volume. The door may include a locking mechanism to prevent unintended or unauthorized access to the storage compartment.

One embodiment of a vehicle comprising a storage compartment may include vertical swing passenger compartment doors. It is customary for vehicle passenger compartment doors to be hinged at the forward edge of the door such that the doors wing outward from the body of the car. However, there are many different types of vehicle doors that open with a vertical swing such as scissor doors, butterfly doors, and gullwing doors. An example of a vehicle including a vertical swing door is disclosed in U.S. patent application Ser. No. 16/376,991, which is incorporated by reference herein. These types of doors typically open with a vertical movement which reduces or even removes the requirement for lateral space adjacent the vehicle in order to operate the vehicle doors. These vertical swing doors may provide additional room to areas in the vehicle where a traditional passenger compartment door may not.

With reference to FIG. 1, an exemplary embodiment of a vehicle 1 is illustrated and includes a passenger compartment door 2 controlling access to the passenger compartment 3. The door 2 may be of a vertical swing door. The vertical swing door provides access to the passenger compartment 3 and the storage compartment (not shown in FIG. 1) when the passenger compartment door 2 is open and at least partially encloses the passenger compartment and storage compartment when the door is closed.

Figure 2:
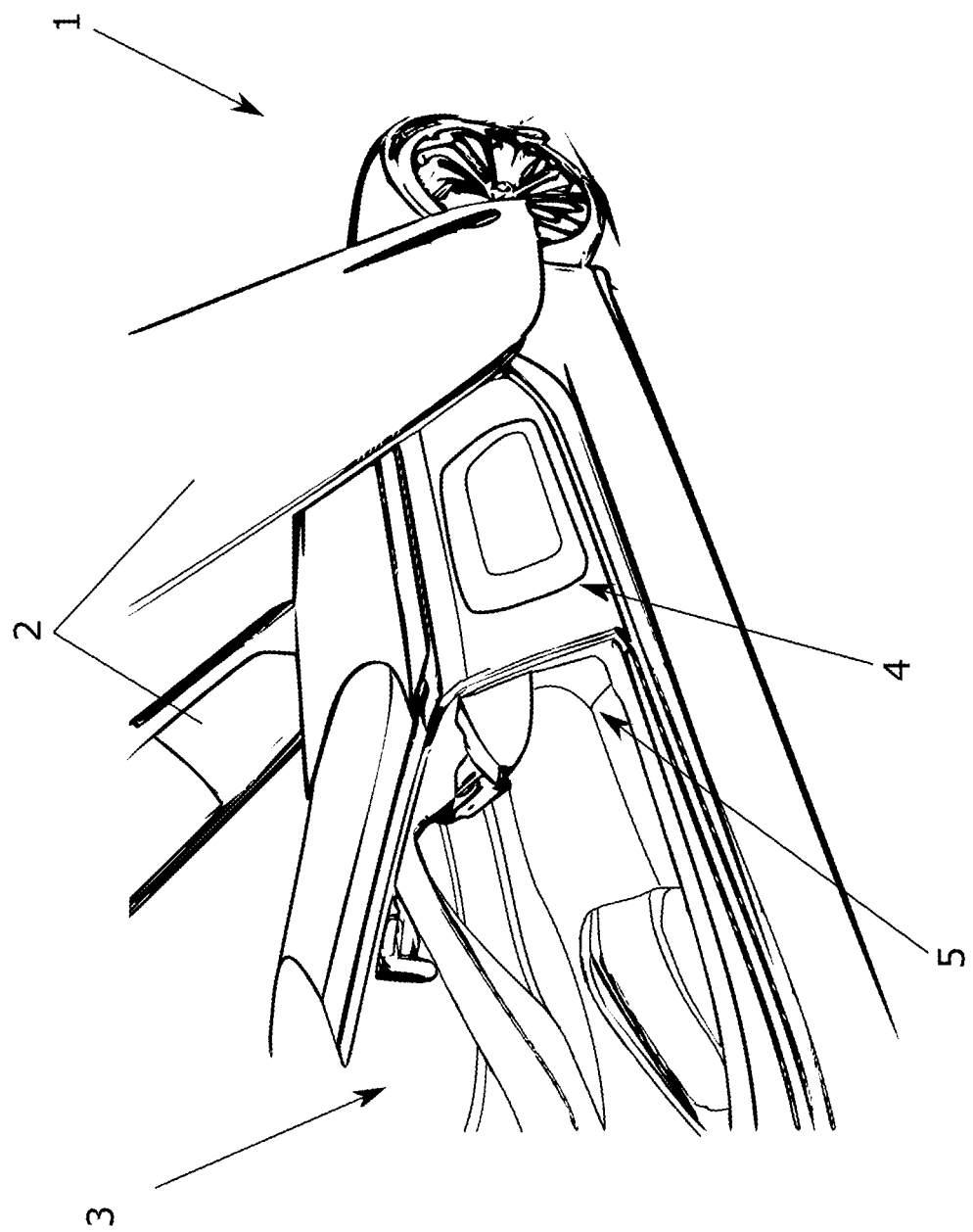
FIG. 2 is a side perspective of a vehicle with an exemplary embodiment of the vehicle storage compartment in a closed position.
Figure 4:
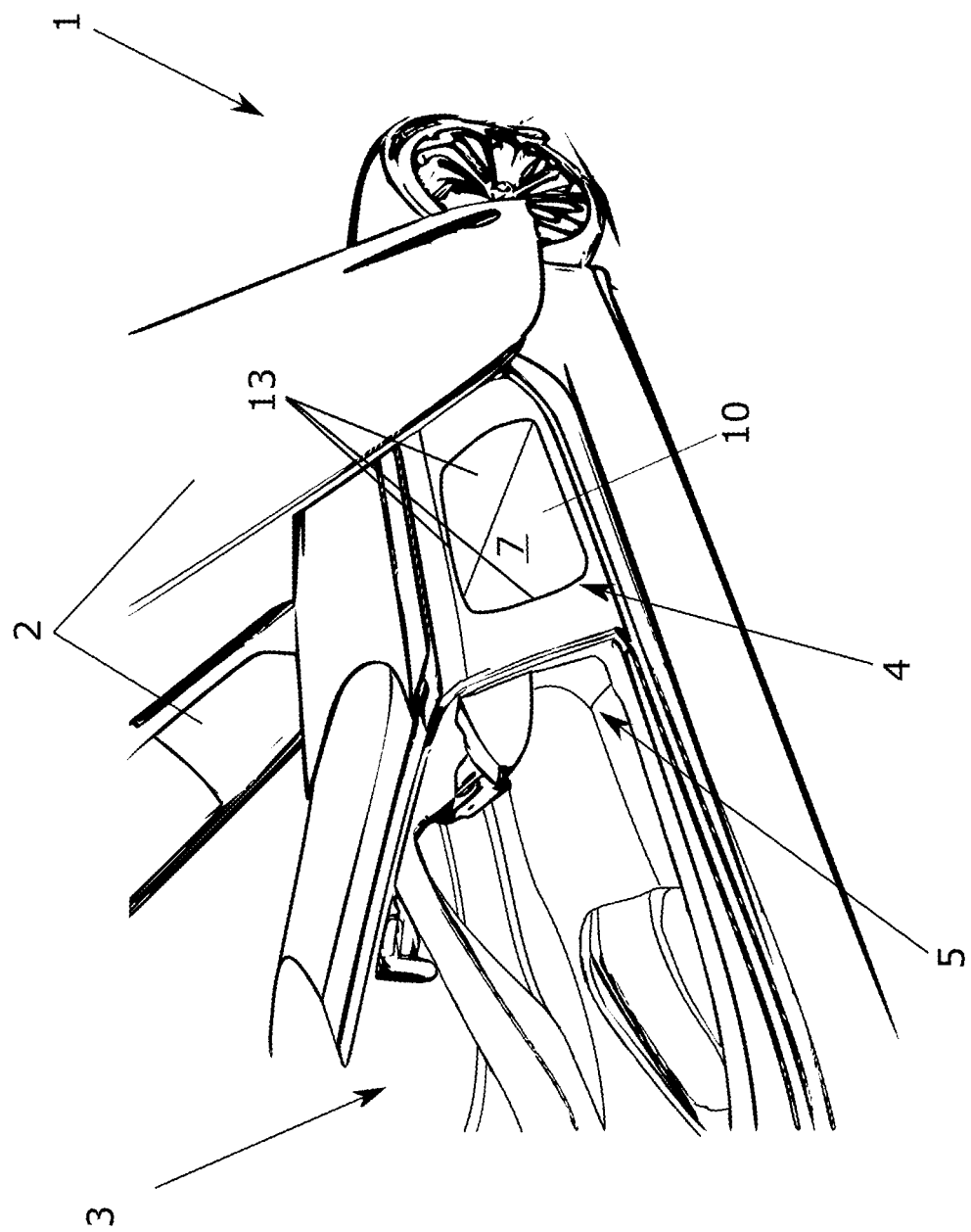
FIG. 4 is a side perspective of a vehicle with an exemplary embodiment vehicle storage compartment.

With reference to FIG. 2, an exemplary embodiment of vehicle 1 may include a storage compartment 4 having a storage volume 7 (see FIG. 4). The storage compartment 4 is located forward of a vehicle footwell 5. The storage compartment may include a separate container or compartment such as a sliding compartment configured to be pulled out of the vehicle from the lateral side. The storage compartment may also include a closure configured to selectively cover the storage compartment door placed at the opening of the storage compartment. The closure may include a hinged door, a sliding door, or similar types of enclosures to provide selective access to the storage compartment. As mentioned above, the closure may include a locking mechanism.

Figure 3:
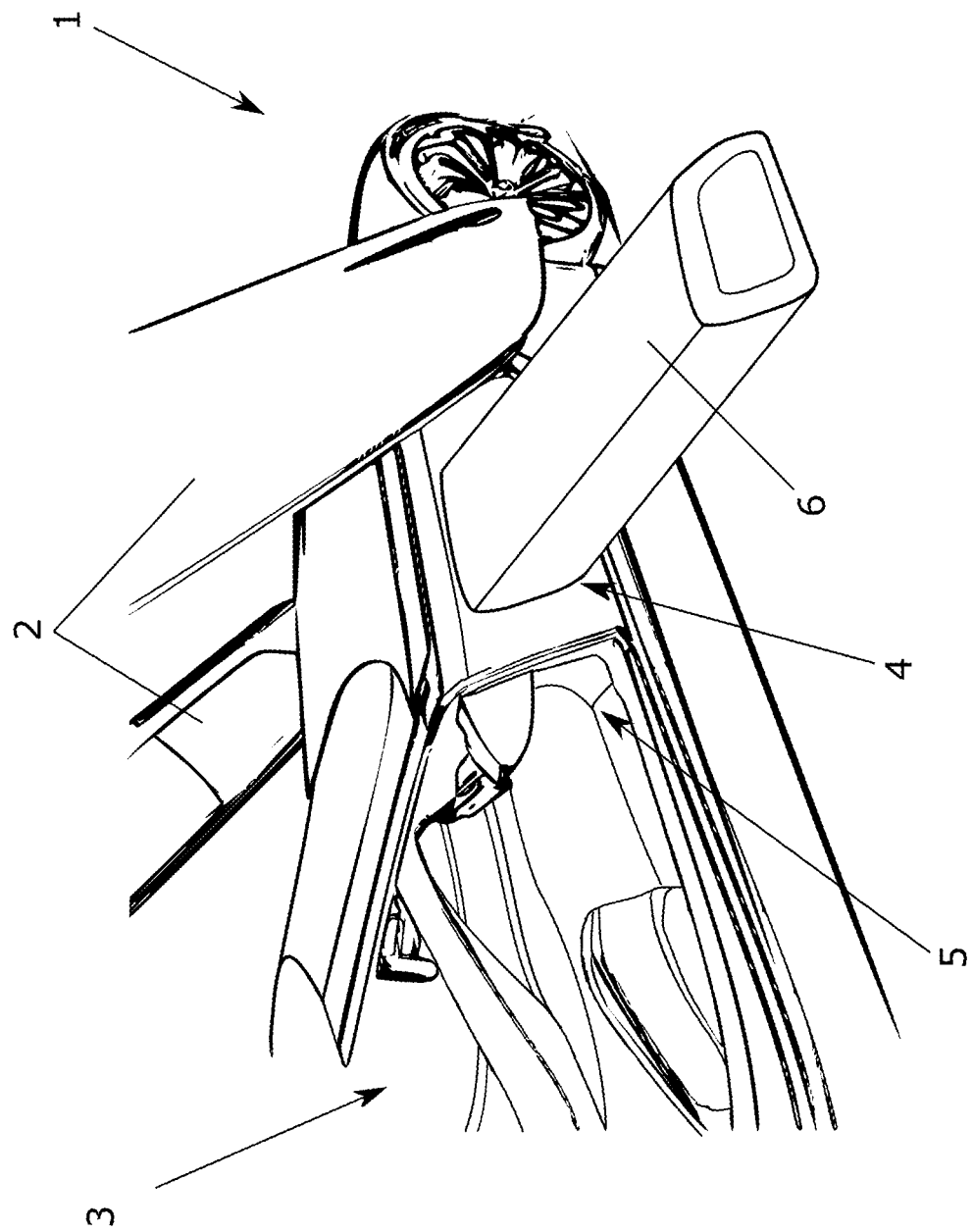
FIG. 3 is a side perspective of a vehicle with an exemplary embodiment vehicle storage compartment in an open position.

With reference to FIG. 3, an exemplary embodiment shows a sliding container 6 protruding from the storage compartment 4. Sensors (not shown) may also be placed proximate to the storage compartment 4. The sensors may signal whether or not the storage compartment is open or closed and may be communicated to a locking mechanism (not shown) of the door to prevent the closure of the passenger compartment door 2.

With reference to FIG. 4, an exemplary embodiment of vehicle 1 may include a storage compartment 4 having a storage volume 7 is shown. The storage volume 7 is exposed such that the door of the vehicle closes off access to the storage volume 7 of the storage compartment 4 when the door is closed. The door 2 may be configured to include a cover portion that is sized and configured to match the opening of the storage compartment 4 so that the storage volume is isolated or even, in some cases, sealed to protect the contents of the compartment. The storage compartment 4 includes a base 10 and a sidewall 11 surrounding the storage volume 7.

The compartment 4 may be connected to the vehicle's HVAC system so that the atmospheric conditions including, for example, the temperature and humidity of the compartment is controlled. The compartment 4 may also include protective or insulating lining so that the contents of the compartment are protected from damage and/or maintained at the appropriate temperature and/or pressure. For example, the compartment may include a cushioned lining. According to another example, the compartment may be lined with an insulating material so that the compartment may be used as a beverage or food cooler.

Figure 5:
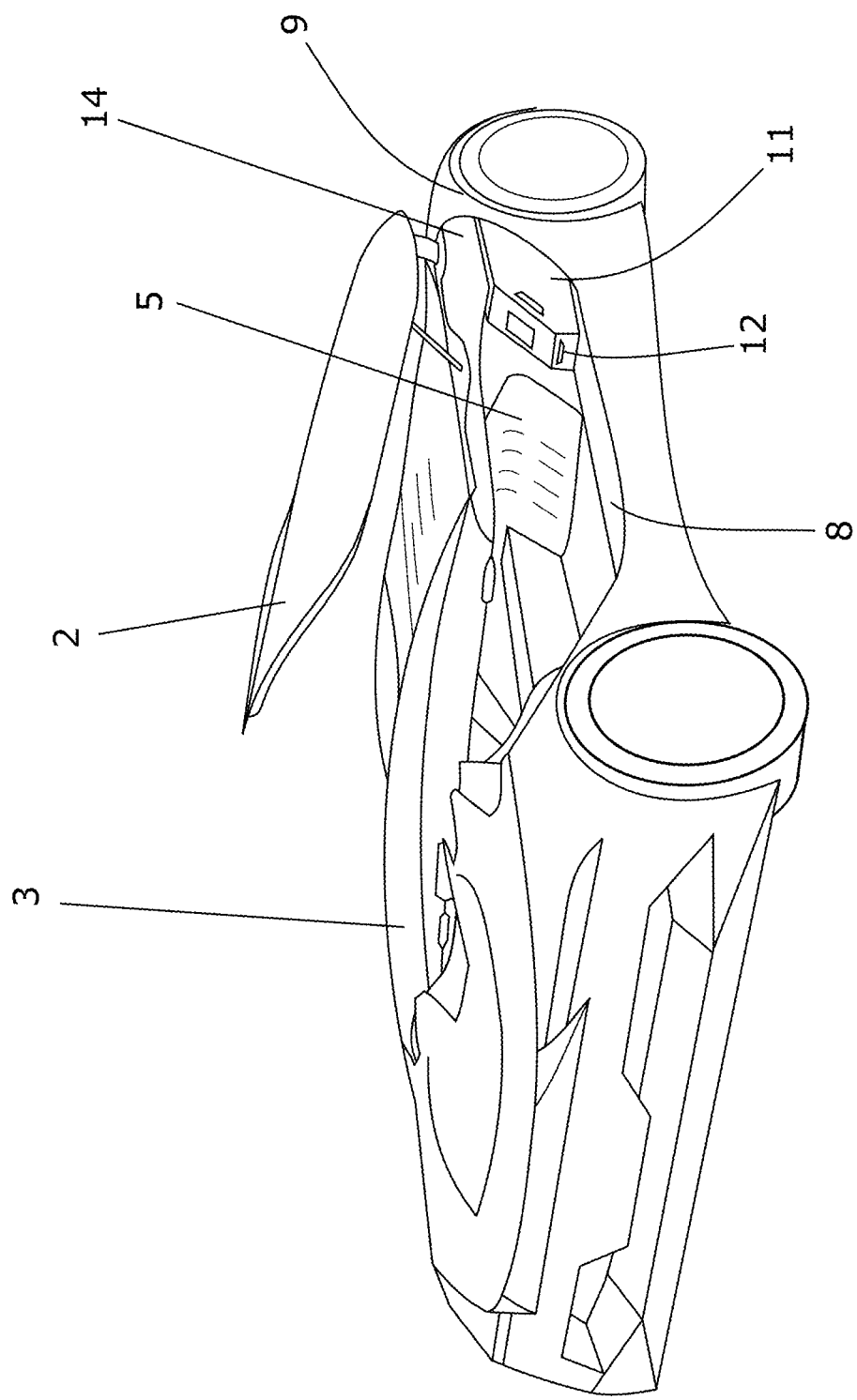
FIG. 5 is a rear three-quarter view of a vehicle with an exemplary embodiment vehicle storage compartment.

With reference to FIG. 5, according to another exemplary embodiment of vehicle 1 may include a storage compartment 14 that is located within the passenger compartment door sill 8 of the vehicle 1. The passenger compartment door sill 8 is located on the side of the car extending from the passenger compartment 3 to the wheel well 9. The passenger compartment may be located directly aft of the forward wheel well and located on a surface of the passenger compartment door sill 8. The storage compartment shown may include dividers (not shown) which partition the storage compartment 14 into sections. For example, the storage compartment 4 may include a first partition 11 and a second partition 12. These partitions may include any door mechanisms as discussed above such as a sliding compartment, a hinged door, or a sliding door, or any similar door mechanisms configured to control access to the storage compartment and the partitions.

References throughout this document to "one embodiment," "certain embodiments," "an embodiment," or similar term mean that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation. For example, two or more of the innovative devices described herein may be combined in a single device, but the application is not limited to the specific exemplary combinations of the storage compartment that are described herein.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

As used herein the several terms forward, aft and lateral refer to the relative location in the vehicle with the forward term referring to the direction pointing to front of the vehicle, the aft term referring to the direction to the rear of the vehicle and the lateral term referring to the direction to the sides of the vehicle wherein the sides connect the front and rear of the vehicle.

A detailed description of various embodiments is provided; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the disclosed embodiments.

While this disclosure makes reference to exemplary embodiments, it will be understood by those skilled in the art that various changes in form and details may be made therein without departing from the scope of the claimed embodiments.

What is claimed is:

1. A storage compartment of a vehicle including a passenger compartment and a passenger compartment door controlling access to the passenger compartment, wherein the storage compartment comprises:
    a base and a side wall surrounding a storage volume;
    wherein the storage compartment is located forward of a footwell of the passenger compartment, the storage compartment is further positioned so that an opening to the storage volume is accessible from a lateral side of the vehicle.

2. The storage compartment of claim 1, wherein a container is configured to be pulled out of the storage compartment in a direction lateral to the vehicle.

3. The storage compartment of claim 1, wherein the storage compartment is located on a surface of a door sill of the passenger compartment door.

4. The storage compartment of claim 1, wherein the storage volume is exposed at the lateral side such that the passenger compartment door of the vehicle encloses the storage volume when the passenger compartment door is closed.

5. The storage compartment of claim 1, wherein the storage volume is located in a passenger side of the vehicle and a driver side of the vehicle.

6. A vehicle comprising:
a passenger compartment, wherein the passenger compartment includes a footwell;
a passenger compartment door configured to control access to the passenger compartment;
a storage compartment including a base and a side wall surrounding a storage volume;
wherein the storage compartment is located forward of the footwell of the passenger compartment, the storage compartment is further positioned so that an opening to the storage volume is accessible from a lateral side of the vehicle.

7. The vehicle of claim 6, wherein a container is configured to be pulled out of the storage compartment in a direction lateral to the vehicle.

8. The vehicle of claim 6, wherein the storage compartment is located on a surface of a door sill of the passenger compartment door.

9. The vehicle of claim 6, wherein the storage volume is exposed when the passenger compartment door is open and wherein the passenger compartment door of the vehicle encloses the storage volume when the passenger compartment door is closed.

10. The vehicle of claim 6, wherein the storage compartment is located in a passenger side of the vehicle and a driver side of the vehicle.

11. A vehicle comprising:
a passenger compartment, wherein the passenger compartment includes a footwell;
a passenger compartment door configured to enclose the passenger compartment, wherein the passenger compartment door includes a forward edge and aft edge;
a storage compartment including a base and a side wall surrounding a storage volume, wherein the storage compartment is located forward of the footwell and located forward of the aft edge of the passenger compartment door and at least partially aft of the forward edge of the passenger compartment door;
wherein the storage compartment is further positioned so that an opening to the storage volume is accessible from a lateral side of the vehicle.

12. The vehicle of claim 11, wherein the storage compartment is entirely aft of the forward edge of the passenger compartment door.

13. The vehicle of claim 12, wherein the storage compartment is proximate with the interior of passenger compartment door and flush with a surface of the lateral side of the vehicle.

14. The vehicle of claim 13, wherein the storage compartment includes a container configured to be pulled out of the vehicle in a direction lateral to the vehicle.

* * * * *